United States Patent [19]

Anjyo et al.

[11] Patent Number: 5,870,096
[45] Date of Patent: Feb. 9, 1999

[54] METHOD AND APPARATUS FOR DISPLAYING IMAGES

[75] Inventors: Kenichi Anjyo, Hitachiota; Tsuneya Kurihara, Tokyo; Ryozo Takeuchi, Hitachi, all of Japan

[73] Assignee: Hitachi, Ltd., Tokyo, Japan

[21] Appl. No.: 272,617

[22] Filed: Jul. 11, 1994

Related U.S. Application Data

[63] Continuation of Ser. No. 630,849, Dec. 20, 1990, abandoned.

[30] Foreign Application Priority Data

Dec. 28, 1989 [JP] Japan .................................. 1-338125

[51] Int. Cl.⁶ ...................................................... G09G 1/09
[52] U.S. Cl. .............................................................. 345/426
[58] Field of Search ..................................... 395/126, 129, 395/130–132; 358/22, 160

[56] References Cited

U.S. PATENT DOCUMENTS

| | | | |
|---|---|---|---|
| 4,709,231 | 11/1987 | Sakaibara et al. ....................... | 340/729 |
| 4,866,637 | 9/1989 | Gonzalez-Lopez et al. ........... | 395/126 |
| 4,897,806 | 1/1990 | Cook et al. .............................. | 395/126 |
| 4,985,779 | 1/1991 | Gall ......................................... | 358/298 |
| 5,060,169 | 10/1991 | Khosla .................................... | 395/129 |
| 5,063,448 | 11/1991 | Jaffray et al. .......................... | 358/160 |

FOREIGN PATENT DOCUMENTS 1-79889  3/1989  Japan .

OTHER PUBLICATIONS

Foley et al, "Fundamentals of Interactive Computer Graphics", 1984, pp. 575–578.

Foley et al, "Computer Graphics Principles and Practice", 1990, pp. 764–765, Jan. 22.

"Computer Display System"; Appel et al; IBM Tech. Disc. Bul.; vol. 15, No. 10, Mar. 1973; pp. 3285–3286.

New Advances in Computer Graphics; Proceedings of CG International '89; "Drawing Human Hair Using Wisp Model"; Watanabe et al; pp. 691–700.

"From Wire–Frames to Furry Animals"; Miller et al; Proc. Graphics Interface 88; pp. 138–145.

"A Simple Method for Extracting the Natural Beauty of Hair" ANJYO et al; Computer Graphics, 26, 2, Jul. 1992; pp. 111–120.

Primary Examiner—Cliff N. Vo.
Attorney, Agent, or Firm—Antonelli, Terry, Stout & Kraus, LLP

[57] ABSTRACT

A system for displaying an image where all or part of an image is generated as an aggregation of very small regions uses, a random number assigned to each very small region so as to change the color or brightness of each very small region when uniform random numbers are generated, the range within which the uniform random numbers are generated is specified by the operator. When the random numbers are generated in accordance with a distributed function, the average value and dispersion value are similarly specified by the operator, so that the image can be more realistically displayed.

41 Claims, 5 Drawing Sheets

F I G. 7
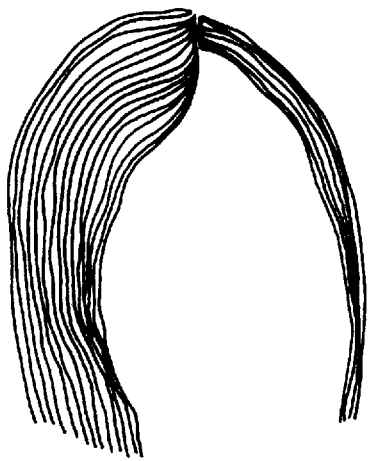

METHOD AND APPARATUS FOR DISPLAYING IMAGES

This application is a continuation of application Ser. No. 07/630,849 filed Dec. 20, 1990, now abandoned.

BACKGROUND OF THE INVENTION

This invention relates to the displaying of images in computer graphics, and particularly to a method and apparatus for displaying images suited to display an image formed of an aggregation of fine regions, for example, fine lines such as the human hairs.

The image processing technique using computer graphics has been rapidly developed to enable various different objects to be displayed. The images of objects having anisotropic reflective properties such as the human hair and fur cannot be realistically expressed yet, and thus they are now being investigated in various fields.

A computer algorithm for expressing the anisotropic reflective properties is disclosed in Proc. Graphics Interface '88, pp. 138–145, "FROM WIRE-FRAMES TO FURRY ANIMALS" (Miller). This conventional makes rendering of models of furry animals with short straight fur.

There is another publication of Proceedings of Computer Graphics International '89, pp. 691–700, "New Advances in Computer Graphics" SPRINGER VERLAG, in which the human hair is represented as straight hair. Moreover, a method of processing the surface of an object concerning the two-dimensional representation of a three-dimensional object is disclosed in Japanese Patent Laid-open Gazette JP-A-64-79889.

In the above-given papers, body hairs on a body or head hairs are approximated by an aggregation of short straight hairs, but the actual feeling of the "gloss" which appears when respective lustrous hairs are equal in their direction cannot be represented realistically. Also, the required computing time is too great to be practical.

These problems are assumed to have been caused by the following facts. The development of CG has so far been made chiefly on the anisotropic reflective model itself which has diffused reflection light in macroscopic but aligned reflection light in microscopic, and therefore the investigation has been centered on the development of theoretical expressions and precise or simple analysis of models according to the optical law. In other words, conventional techniques do not effectively specify the color, tone, and brightness for each very small region, or each hair as a unit to be displayed, and does not consider that upon displaying, the outline of an object image should be displayed at high speed for practical purpose even though the display is not a physically strict simulation.

SUMMARY OF THE INVENTION

It is a first object of the invention to provide a method and apparatus for displaying images which is capable of rapidly specifying color and brightness for each very small region when an aggregation of very small regions having anisotropic reflective properties is displayed differently for each very small region.

It is a second object of the invention to provide a method and apparatus for displaying which is capable of changing the representation of an aggregation of very small regions for realistically displaying images.

The first object can be achieved by assigning a random number to each very small region so as to display each very small region with different color and brightness when all or part of an image is generated as an aggregation of very small regions.

The second object is achieved by operator's changing and specifying the range of uniform random numbers to be generated or the average and dispersion of random numbers to be generated according to a distribution function.

When a color and brightness are specified for each very small region, it takes a long time for an operator to specify such for each region. However, this invention automatically specifies for each region by using random numbers from a probability point of view, and is thus capable of high-speed designation and displaying.

Moreover, by changing the range of random numbers to be generated, it is possible to change the deviation of the color and brightness of each very small region and hence to change the feeling of quality of a rendered aggregation of very small regions on a display.

The other objects and constructions of this invention will be understood from the following description with reference to the accompanying drawings.

BRIEF DESCRIPTION OF THE DRAWINGS

FIG. 7 shows a female hair style as an anisotropic reflective model for displaying images according to the embodiments of the invention.

DESCRIPTION OF THE PREFERRED EMBODIMENTS

One embodiment of this invention will be described with reference to the drawings.

This invention can be applied to the display of the general image all or part of which is an aggregation of very small regions. For convenience of explanation, description will be made of the display of a female's hair style as a typical example of the anisotropic reflective model as shown in FIG. 7.

FIG. 7 shows a model of a hair style, in which each hair is drawn and gaps are left between the respective hairs for separation of each hair. The gaps between hairs lose the reality of the representation of hair. Thus, in order to realistically display the hair by computer graphics, it is necessary to render the hair without gap. If the gaps between hairs are merely removed, however, the head of hair becomes black over all area like the so-called all-over painting. The respective hairs have differently lustrous and also each bundle of hair has a gloss. However, if the gloss which each bundle of hair has is to be represented, the reality cannot be achieved by only painting the hair all over and providing uniform luster over all the area. In practice, when all head of hair is looked at, the tangential component of the reflected light from each hair is a substantially parallel light ray, but the perpendicular component is near diffused reflection, with the result that the hair is perceived as bundles of many lines having luster. It takes a tremendously much long time and is thus impractical to actually simulate this situation by use of the optical theoretical equations. Thus, in this embodiment, the brightness of each hair is changed upon displaying so that the viewer can perceive the hair as bundles of many hairs.

Figure 2:
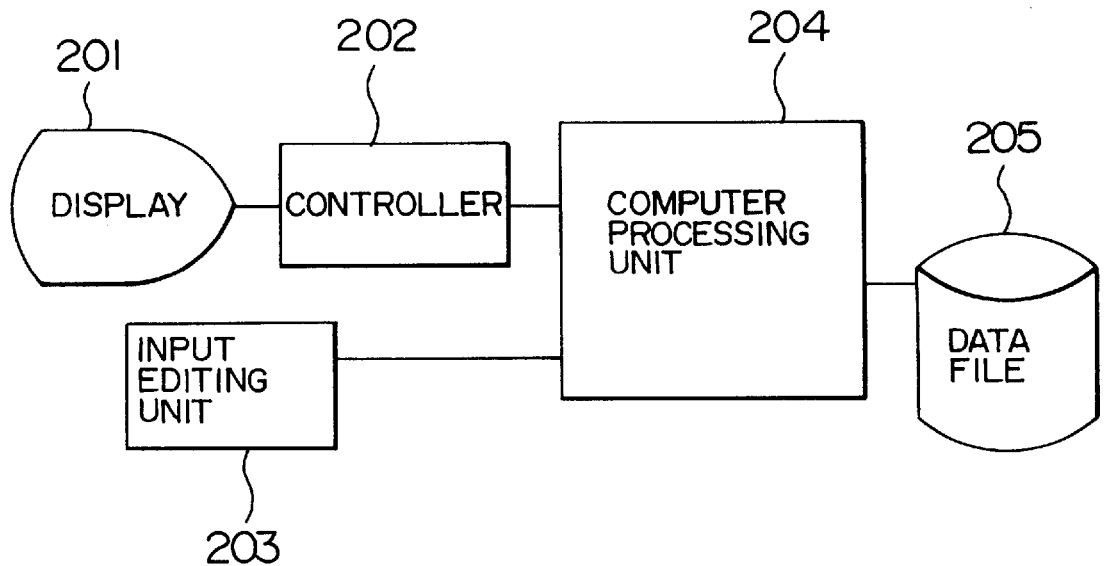
FIG. 2 is a block diagram of one embodiment of an apparatus for displaying images of the invention.

FIG. 2 is a block diagram of one embodiment of an image displaying apparatus of the invention. This image displaying apparatus comprises a display 201 for displaying an image, a controller 202 for controlling the display, an input editing unit 203 capable of interactive processing while watching the image on the display 201, a computer processing unit 204 and a data file 205.

Figure 1:
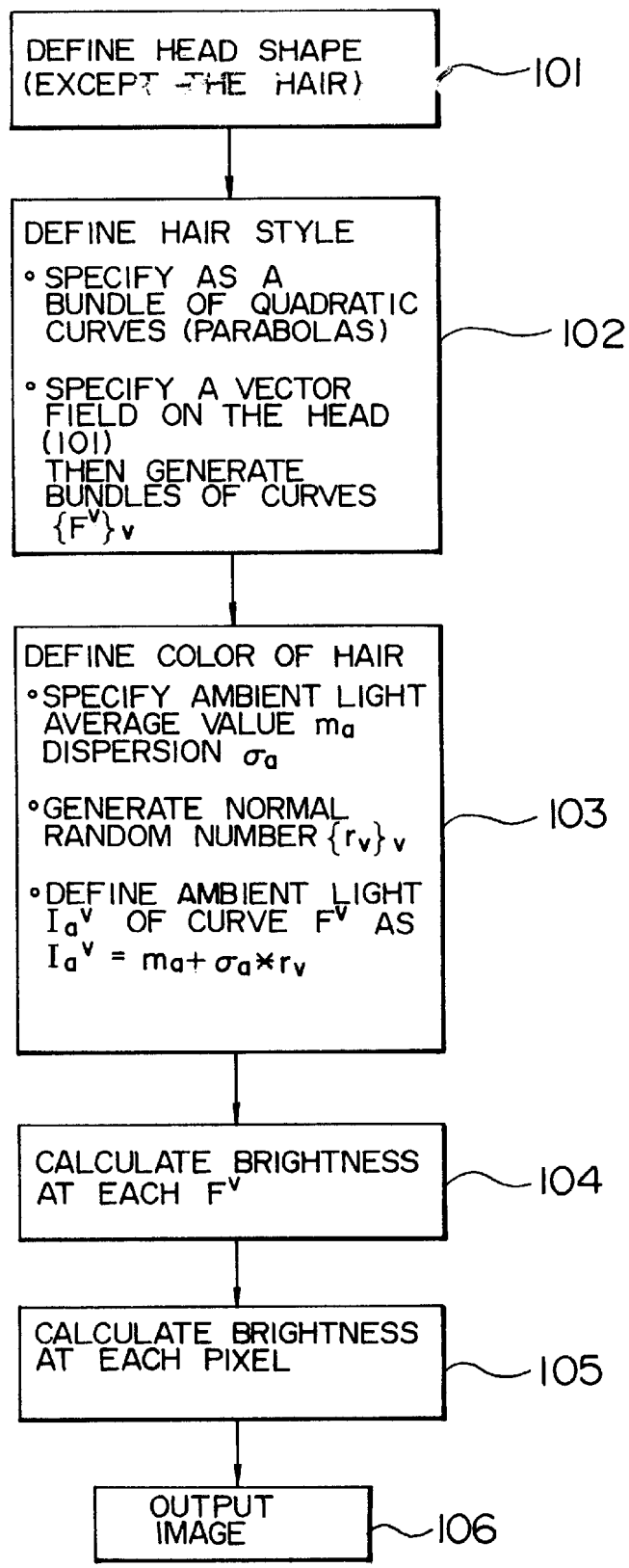
FIG. 1 is a flowchart for the processing steps of one embodiment of a method of displaying images of this invention.

FIG. 1 is a flowchart for processing steps at the computer processing unit shown in FIG. 2. First, the human head is defined (step 101), the hair style is defined (step 102), and then the color of hair is defined (step 103). The operator specifies at each of these steps as described below. The computer processing unit 204 computes the brightness of each hair, or each unit of very small region (step 104), and then computes the brightness of each picture element or pixel constituting very small regions (step 105). Finally, the generated image is displayed on the display 201 (step 106).

The definition of the head at step 101 can be made by various different methods. In this embodiment, a polygonal model is generated on the basis of data of shape of human head which is designated from a three-dimensional digitizer, and this model is defined as a surface model of head.

The definition of the hair (hair style) at step 102 in this embodiment is made by designating each hair as a curve model and defining the hair style as an aggregation of the curve models. In other words, the definition of hair style is nothing but the control of the aggregation of curves, or the bundle of curves. For example, a vector field is designated at each point of the head on which the hair is depicted, and each curve is generated as a locus of a parabola having the initial velocity at that point. Interference check is made for the curves not to enter into the head as a matter of course, and the loci of the curves are corrected. The curves and the method of generating the curves are not limited to the two-dimensional parabola, but of course may be other curves and other methods of generating the curves.

The parameter of the longitudinal direction of each curve is denoted by "u", and the index of each curve by "v", for representing each curve. If, now, the two-dimensional region is indicated by "$\Omega$", the three-dimensional space denoted by "$R^3$", and a mapping f defined by "$\Omega \to R^3$", then $f(u, v) \in R^3$ is satisfied for $(u, v) \in \Omega$. Here, if the actual value functions $f_1(u, v)$, $f_2(u, v)$, $f_3(u, v)$ on $\Omega$ are used to express the function $f(u, v)$ as $f(u, v)=(f_1(u, v), f_2(u, v), f_3(u, v))$, each curve can be expressed as $$F^v(u)=(f_1(u, v), f_2(u, v), f_3(u, v)) \tag{1}$$

by fixing each index v in the mapping f(u, v). Thus, the bundle of curves is expressed by $$\{F^v\}v \tag{2}$$

In this embodiment, each curve $F^v$ defined as above is displayed with different brightness. Thus, at step 103, the color of each hair (curve) is defined. Generally, the brightness $I_P$ at a point P on a certain object is defined as the sum of an ambient light component Ia, a diffused light component Id and a directly reflected light component Is:

$$I_P=Ia+Id+Is \tag{3}$$

If the brightness is expressed by primary colors of red(R), green(G) and blue(B), each term on both sides of Eq. (1) for expressing a curve is allotted with an actual value for each component of R, G, B. In other words, each term of Eq. (3) can be expressed by a three-dimensional vector.

Figure 3:
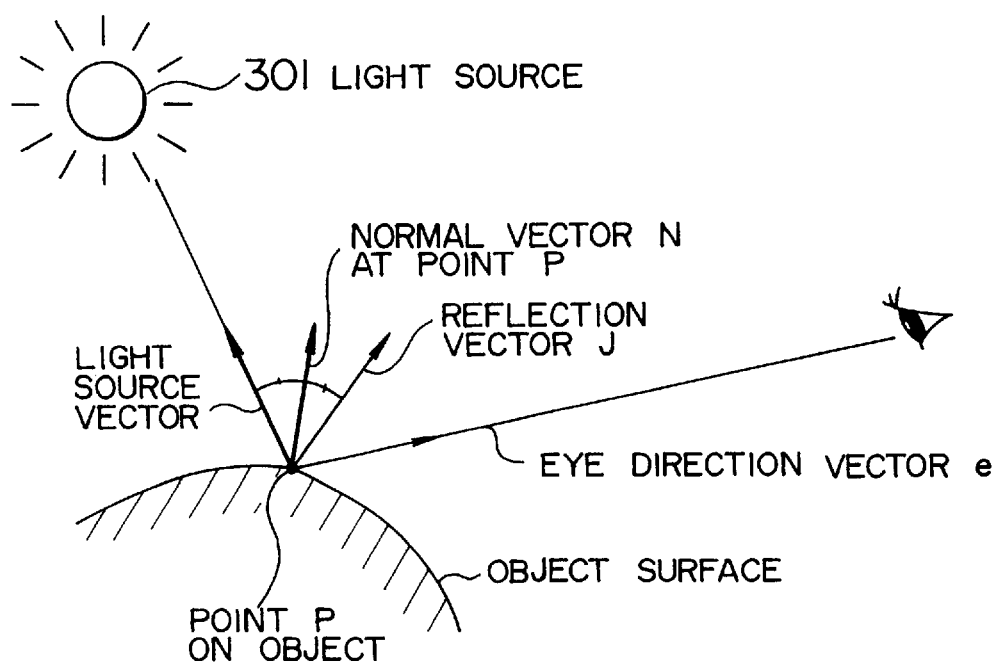
FIG. 3 is a diagram of vectors necessary for computing of brightness.

The diffused light component Id, as shown in FIG. 3, is determined as the function of the orientation (specified by unit vector L) of a light source 301 as viewed from a certain point P on the object surface, and of the orientation of a normal vector N at the point P. In other words, the following equation can be satisfied:

$$Id=hp (L, N, \ldots) \tag{4}$$

Moreover, the directly reflected light Is is determined as the function of operator's eye direction vector e in addition to the orientation (unit vector L) of the light source and the orientation of the normal vector N. That is, $$Is=gp (e, L, N, \ldots) \tag{5}$$

For example, the model of Phong is given as $$hp(L, N, \ldots)=Mp \times ip \times (L, N) \tag{6}$$

Mp: the color of the object at point P ip: the color of a particular light source for illuminating the object (L, N): scalar product of vectors L and N $$gp(e, L, N, \ldots)=wp \times ip \times (J, e)^n \tag{7}$$

wp: the reflection coefficient (scalar)

Figure 4:
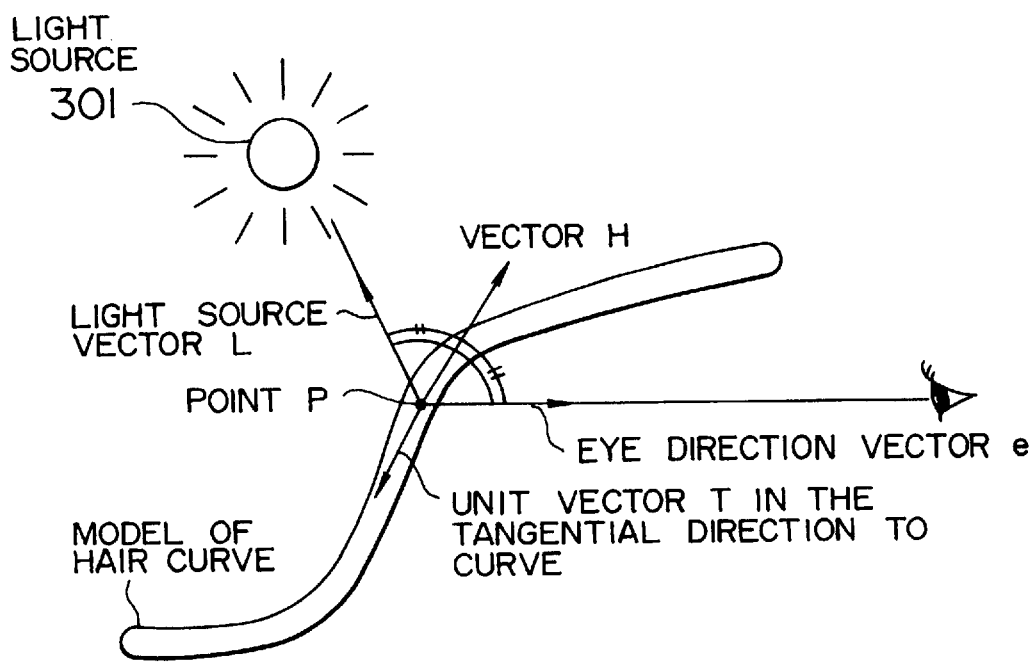
FIG. 4 is a diagram of vectors necessary for computing brightness at points on a curve.

J: the unit vector determined so that the vector N and vector L+J are parallel n: natural number In this embodiment, particularly the function gp is the simplified one of Blinn model for curve representation. As shown in FIG. 4, in the Blinn model, the function gp is determined depending on the unit vector H in the intermediate direction of vector L and vector e, and the unit vector T in the tangential direction of the hair curve model, that is, $$Is=gp (H, T, \ldots) \tag{8}$$

The diffused light component Id and the directly reflected light component Is are found from Eqs. (4), (8), and the brightness Ip at the point p is determined by adding the sum of these and the ambient light component Ia from Eq. (3). The curve model of continuous points and the brightness of each point of one very small region unit in this embodiment are calculated and displayed as one curve.

On the other hand, the ambient light component Ia in Eq. (3) is determined only by the color of the object and the color of uniformly diffused light. It takes a long time to designate this for each curve and thus it is impractical to represent the bundle of several hundreds or several thousands of curves. Thus, in this embodiment, the ambient light component Ia is calculated from the following equation (9):

$$(Ia)v=ma+\sigma a \times (r)v \tag{9}$$

where "r" is the distribution function, for example, random numbers according to a normal distribution, "ma" is the average value, and "σa" is the dispersion. When the average value ma and the dispersion value σa are inputted by the operator, the computer processing unit generates the random number r according to the input. If a bundle of 2000 curves is represented, 2000 (v=1 to 2000) random numbers are generated, and the random numbers are assigned to the curves, respectively, and the ambient light component (Ia)v in the index v curve is computed from Eq. (9).

The brightness Ip to be found is defined within the range of $$0.0 \leq Ip \leq 1.0 \tag{10}$$

(this condition means that the R, G, B components of Ip are larger than 0 and less than 1). When the components Id, Is, Ia at the respective points of each curve are computed from Eqs. (4), (8) and (9), the brightness Ip at each point can be found from Eq. (3). Then, correction is made as $$Ip = \min(1, \max(0, Ip)) \tag{11}$$

This means that the R, G, B components are corrected as in Eq. (10).

This brightness computation is processed for each picture element of an image to be generated, as follows. At each pixel, the area ratio at which the curve model occupies the pixel is determined and denoted by $\Delta p$. Then, the color $Ipx_1$ of each pixel is found from the following equation (12) for the brightness Ip determined by Eq. (3):

$$Ipx_1 = \sum_p Ip\Delta p \tag{12}$$

In this equation, the sum on the right side is for all points p on the bundle of curves projected on this pixel.

The color Ipxn for each pixel is calculated from Eq. (12), and displayed, so that the hair can be represented by a bundle of many curves and thus displayed as a realistic image.

In the above embodiment, particularly the ambient light component Ia of each curve is found on the basis of the random numbers from Eq. (9), or the ambient light component Ia of each curve is determined from a probability point of view without specifying each component Ia by the operator. Thus, since the color of each curve constituting a bundle of curves is changed delicately (in this embodiment, since the brightness is expressed by three primary colors, R, G, B, the color is changed by the change of the brightness), the feeling of quality such as gloss is displayed. However, by changing the brightness (color) of the directly reflected light component Is from a probability point of view, not by the ambient light component, it is possible to achieve the same effect. Moreover, while in this embodiment the random numbers according to a distribution function are used, the brightness (color) of each curve may be changed by use of uniform random numbers.

When the feeling of quality of bundles of curves is desired to change, the deviation of the brightness of each curve of bundles of curves is changed. This deviation can be changed by changing the dispersion value σ as far as the random numbers according to a distribution function are concerned. Also, when uniform random numbers are used, the deviation can be changed by the fact that, for example, 2000 random numbers are generated within the range of 0 to 2000 or within the range of 0 to 10000.

Figure 5:
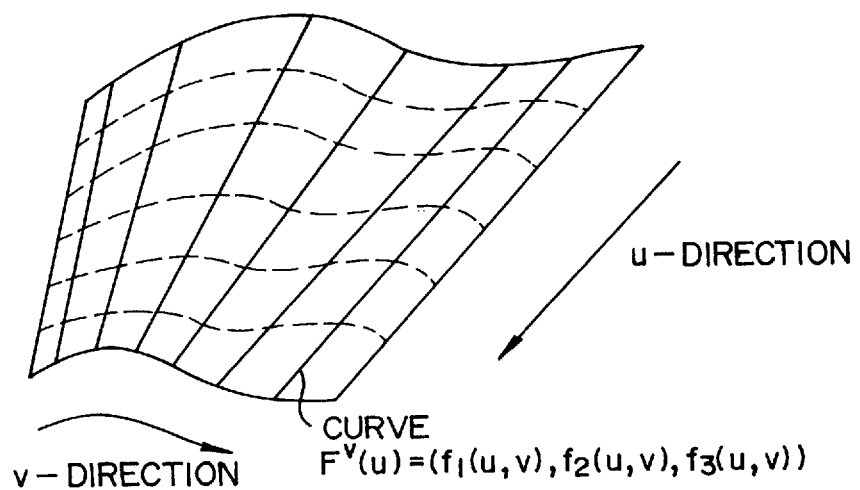
FIG. 5 is a conceptional diagram for defining a curved surface as a bundle of curves.
Figure 6:
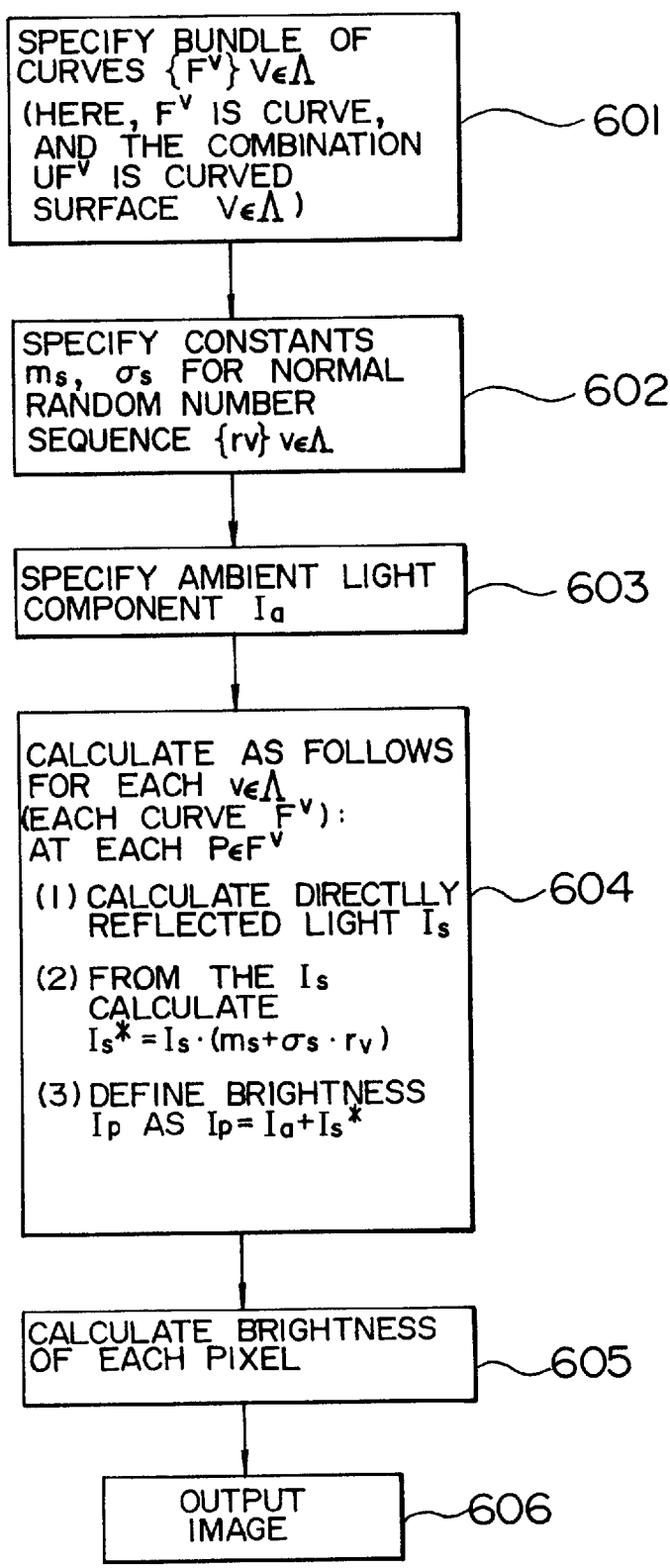
FIG. 6 is a flowchart for the processing steps of another embodiment of a method of displaying images of this invention.

Another embodiment of the invention will be described. This embodiment is for the hair line finishing in the mechanical system CAD. In this embodiment, it is also assumed that curves are given in the form of Eqs. (1), (2) as in the first embodiment. Also, as shown in FIG. 5, each curve $F^v$ is assumed to extend in the hair line direction. While in the first embodiment random numbers are used for the computation of ambient light component Ia, in this embodiment a random number row {rv} is used for the computation of directly reflected light Is. The computation procedure is shown in FIG. 6. Since the processing in this embodiment is local, the description is limited to one curved surface patch as shown in FIG. 5, but this embodiment can be similarly applied to the general curved surface.

In this embodiment, first the representation of bundles of curves of the curved surface (Eqs. (1) and (2)) is given (step 601)). Then, the average value m and dispersion σ of the random number row to be generated are specified (step 602), and the ambient light component Ia is specified (step 603). The ambient light component Ia, in this embodiment, is inputted under the assumption that it is constant over all the curved surface.

At step 604, the brightness $I_P$ is calculated from the following equation:

$$I_P = Ia + Is^*$$

In this embodiment, the computation time is reduced by omitting the diffused light component Id (even in Eq. (3) in the first embodiment, the diffused light component Id may be omitted). Here, the directly reflected light component Is is found from Eq. (8), and this value Is, the average value m and dispersion σ at step 602, and the random number row {rv} are used for the calculation of Is* which is the addition of fluctuation due to random numbers to the directly reflected light component Is, from the following equation:

$$Is^* = Is \times (m + \sigma \times rv)$$

The brightness $I_P$ thus obtained is used for the calculation of the brightness of each pixel (step 605), and each pixel is displayed (step 606).

In this embodiment, the ambient light is uniform at each point on the curved surface. Thus, the anisotropic situation around the directly reflected light is emphatically depicted.

This invention is also effective for the displaying of the result of the numerical analysis. So far, an image of a set of arrow vectors is displayed in the form of discrete streamline vector field. This is satisfactory for observing the outline, but the result of computation is not precisely displayed. Thus, for example, the result of the analysis of a fluid is represented as a streamline bundle, and the brightness of each streamline is calculated and displayed as in the above described embodiment, so that the result of numerical analysis can be displayed precisely as streamlines. In this case, as in the first embodiment, the ambient light component Ia is controlled by random number row, thereby enabling the relation between the respective streamlines to be precisely displayed. The computation of the directly reflected light Is may be omitted because it has no physical meaning when streamlines are displayed. However, where the curvature is suddenly changed, the highlighting light (directly reflected light) becomes intense. Thus, when such area is desired, it is effective to display images considering the directly reflected light component Is.

Although in the above embodiment, the ambient light component is computed from $$Ia = m + \sigma \times r,$$

this shows that the ambient light Ia is randomly changed around the value m. This invention is not limited to this equation, but may be applied to the case in which at least one of the ambient light component and the directly reflected light component is randomly changed in each very small region. For example, the brightness may be computed from the function Y which randomly changes with the index v of $$(I_P)v = Y(v)$$

as a parameter. In this case, it is necessary for the operator to specify the function Y itself. Also, the function of $$(I_P)v = Y(s(a), v)$$

can be used for the computation of the brightness $I_P$ by designating a reference value of the variable s(a) (this is generally a vector value) by the operator and by determining the value of the variable s(a) random around this reference value by the computer. In the above embodiment, the average value m and the dispersion σ correspond to this reference value.

According to this invention, when an image of an aggregation of very small regions is displayed, the brightness and color of each very small region can be simply and easily changed, thus enabling the image of the aggregation of very small regions to be displayed realistically and at high speed. Moreover, since the deviation of random numbers used can be changed, the operator can select the degree of the feeling of quality such as gloss upon displaying.

We claim:

1. An image generating and displaying method for generating and displaying all or part of a three-dimensional object as an aggregation of three-dimensional parts of the object, comprising the step of:

generating image data by, when a brightness $I_P$ of each point of each three-dimensional part is computed as at least the sum of an ambient light component Ia and a directly reflected light component Is, computing at least one of said ambient light component Ia and said directly reflected light component Is by applying a random number assigned to each of the three-dimensional parts to at least one of the ambient light component and the directly reflected light component; and displaying the generated image data by displaying the computed brightness $I_P$ of each of the three-dimensional parts as the three-dimensional object.

2. An image displaying method according to claim 1, wherein an average value and a dispersion of a random number row {r} according to a distribution function formed of random numbers r assigned to the respective regions are denoted by m and σ, respectively, the brightness $I_P$ of each region is computed from the following equation:

$$Ia = m + \sigma * r,$$

or $$Is = m + \sigma * r.$$

3. An image generating and displaying method according to claim 2, wherein a characteristic of the three-dimensional parts is changed by varying the dispersion σ.

4. An image generating and displaying method for generating and displaying all or part of a three-dimensional object as an aggregation of three-dimensional parts of the object comprising the steps of:

generating image data by, when a brightness $I_P$ of each point of each three-dimensional part is computed as at least the sum of an ambient light component Ia and a directly reflected light component Is, computing at least one of said ambient light component Ia and said directly reflected light component Is by applying a random function specified by an operator and assigned to each of the three-dimensional parts to at least one of the ambient light component and the directly reflected light component; and displaying the generated image data by displaying the computed brightness $I_P$ of each of the three-dimensional parts as the three-dimensional object.

5. An image generating and displaying method for generating and displaying all or part of a three-dimensional object as an aggregation of three-dimensional parts of the object, comprising the steps of:

generating image data by computing a color of each three-dimensional part by applying a random number assigned to each of the three-dimensional parts to at least one of the ambient light component and the directly reflected light component; and displaying the generated image data by displaying the computed color of each of the three-dimensional parts as the three-dimensional object.

6. An image generating and displaying method for generating and displaying a three-dimensional object having an anisotropic reflective property, and displaying all or part of the three-dimensional object as an aggregation of three-dimensional parts of the object, comprising the steps of:

generating image data by changing one of a color and brightness of each three-dimensional part by applying random numbers assigned to respective three-dimensional parts to at least one of the ambient light component and the directly reflected light component; and displaying the generated image data by displaying the changed color or brightness of each of the three-dimensional parts as the three-dimensional object.

7. An image generating and displaying method for generating and displaying all or part of a three-dimensional object as an aggregation of three-dimensional parts of the object, comprising these steps of:

generating image data comprising the steps of:
computing one of a color and a brightness $I_P$ of each three-dimensional part as at least the sum of an ambient light component Ia and a directly reflected light component Is,
computing at least one of said components from a function of parameters of an index indicating said three-dimensional parts and a variable for which a user specifies a reference value, and
when each three-dimensional part is computed from said function, assigning said variable with random numbers so as to be randomly changed relative to said reference value at each three-dimensional part; and displaying the generated image data by displaying the computed color or brightness of each of the three-dimensional parts as the three-dimensional object.

8. An image generating and displaying method according to claim 5, wherein said random numbers are uniform random numbers, and a range of said uniform random numbers is changed to vary a characteristic of display at the three-dimensional parts.

9. An image generating and displaying apparatus for generating a three-dimensional object as an aggregation of three-dimensional parts of the object as all or part of an image and displaying said three-dimensional object on a display, comprising:

9 means for generating image data comprising:
means for generating a random number row (r) and assigning a random number to each three-dimensional part,
means for computing at least one of an ambient light component Ia and a directly reflected light component is by applying the assigned random numbers to at least one of the ambient light component and the directly reflected light component when the brightness $I_P$ of each point of each three-dimensional part is computed as at least the sum of the components Ia and Is; and means for displaying the generated image data by displaying the computed brightness $I_P$ of each three-dimensional part as the three-dimensional object.

10. An image generating and displaying apparatus according to claim 9, further comprising means for computing the brightness $I_P$ of each three-dimensional part from the following equation $$Ia = m + \sigma * r,$$

or $$Is = m + \sigma * r$$

where said random numbers are those according to a distribution function, and the average value and dispersion of said random number row $\{r\}$ are respectively denoted by m and $\sigma$.

11. An image generating and displaying apparatus according to claim 10, further comprising means for specifying said average value m and said dispersion $\sigma$, wherein said random number generating means generates the random numbers on the basis of said specified average m and dispersion $\sigma$.

12. An image generating and displaying apparatus for generating a three-dimensional object as an aggregation of three-dimensional parts of the object as all or part of an image and displaying said three-dimensional object on a display, comprising:
means for generating image data comprising:
means for randomly specifying by an operator a function from which at least one of an ambient light component or a directly reflected light component is computed when a brightness and a color of each three-dimensional part is computed, and
means for adding one component computed from the specified function to the other component, thereby determining said one of the brightness and color of each of the three-dimensional parts; and
means for displaying the generated image data by displaying the determined one of the brightness and color of each of the three-dimensional parts as the three-dimensional object.

13. An image generating and displaying apparatus including an arithmetic processor for generating image data by computing a shape and a reflective property of a generated three-dimensional object and a display for displaying the generated image data by displaying the computed shape and reflections property of said generated three-dimensional object, said arithmetic processor comprising:
means for generating random numbers; and
means for assigning said generated random numbers from said random number generating means when all or part of the generated three-dimensional object is displayed as an aggregation of three-dimensional parts of the

10 object, changing a color of each of the three-dimensional parts on the basis of said random numbers assigned to each of the three-dimensional parts to at least one of an ambient light component and a directly reflected light component and displaying the changed color of each of the three-dimensional parts as the three-dimensional object.

14. An image generating and displaying apparatus for generating and displaying a three-dimensional object having an anisotropic reflective property, and displaying all or part of the three-dimensional object as an aggregation of three-dimensional parts of the object comprising:
means for generating image data by changing one of a color and a brightness of each three-dimensional part by applying random numbers assigned to each of the three-dimensional parts to at least one of an ambient light component and a directly reflected light component; and means for displaying the generated image data by displaying the changed color or brightness of each three-dimensional part as the three-dimensional object.

15. An image generating and displaying apparatus including image data generation apparatus for generating image data by generating all or part of a three-dimensional object as an aggregation of three-dimensional parts of the object and a display for displaying the generated image data, said image data generation apparatus, comprising:
means for finding an ambient light component and a directly reflected light component for computation of a brightness of each three-dimensional part, and displaying said three-dimensional parts with the brightness of at least the sum of said components;
means for specifying by an operator a reference value of a function from which at least one of said components is computed and which has parameters of a region index and a variable; and
means for causing said variable to be randomly changed from said reference value at each three-dimensional part when said components are computed from said function at each three-dimensional part.

16. An image generating and displaying apparatus according to claim 13, further comprising means for arbitrarily changing a set range within which said random numbers are generated, said random numbers being uniform random numbers.

17. An image generating and displaying apparatus for generating all or part of a three-dimensional object as an aggregation of many curves and displaying the same on a display comprising:
means for generating image data comprising:
means for specifying a variable m and a variable $\sigma$ by an operator,
random generating means for generating random numbers according to a distribution function of which the average value is the specified value of said variable m and of which the dispersion is the specified value of said variable $\sigma$, and assigning each random number r to each of said curves,
means for computing the brightness of each of said curves as the sum of at least an ambient light component and a directly reflected light component, and
means for computing one of said ambient light component and said directly reflected light component as "$m + \sigma * r$" by applying a random number assigned to each of the three-dimensional parts to at least one of the ambient light component and the directly reflected light component; and means for displaying the generated image data by displaying each curve with the computed brightness.

18. A method for generating and displaying all or part of an image of an aggregation of linear objects, an image of each linear object includes a plurality of continuous segments, comprising the steps of:

generating image data by calculating a brightness of each of said segments by making a sum of at least one of an ambient light component and a directly reflected light component at said segment, wherein at least one of said ambient light component and said directly reflected light component is multiplied by a random number assigned to said each linear object; and displaying the generated image data.

19. A method according to claim 18, wherein said random number is provided from a random number row according to a distribution function, said random number row including an average value and a dispersion.

20. A method for generating and displaying all or part of an image of an aggregation of linear objects, an image of each linear object includes a plurality of continuous segments, comprising the steps of:

generating image data by calculating a brightness of each of said segments by making a sum of at least one of an ambient light component and directly reflected light component at said segment, wherein at least one of said ambient light component and said directly reflected light component is multiplied by a random function indicated by an operator; and displaying the generated image data.

21. A method for generating and displaying all or part of an image of an aggregation of linear objects, an image of each linear object includes a plurality of continuous segments, comprising the steps of:

generating image data comprising the steps of:

calculating a brightness of each of said segments by making a sum of at least one of an ambient light component and a directly reflected light component at said segment, and calculating colors of said linear objects by correlating each of said linear objects with a random numbers; and displaying the generated image data.

22. A method for generating and displaying all or part of an image of an aggregation of linear objects having anisotropic reflective properties, an image of each linear object includes a plurality of continuous segments, comprising the steps of:

generating image data comprising the steps of:

calculating a brightness of each of said segments by making a sum of at least one of an ambient light component and a directly reflected light component at said segment, and calculating colors of said linear objects by correlating each of said linear objects with a random number; and displaying the generated image data.

23. A method for generating and displaying all or part of an image of an aggregation of linear objects, an image of each linear object includes a plurality of continuous segments, comprising the steps of:

generating image data comprising the steps of:

calculating one of a brightness and displayed color of each of said segments by making a sum of at least one of an ambient light component and a directly reflected light component at said segment, and calculating using a function with parameters including an index indicating said segment and a reference value specified by a user for calculating one of said ambient light component and said directly reflected light component, wherein a random number is used for said reference value at each said segment in said calculation with said function; and displaying the generated image data.

24. A method according to any one of claims 21 to 23, wherein said random number is selected from uniform random numbers, and a range of said uniform random numbers is changed.

25. An image generation and display apparatus including image data generation apparatus for generating image data and a display for displaying the generated image data by displaying all or part of an image of an aggregation of linear objects, wherein an image of each linear object includes a plurality of continuous segments, and a brightness of each of said segments is calculated by making a sum of at least one of an ambient light component and directly reflected light component at said segment, said image data generation apparatus comprising:

means for generating a random number row and assigning random numbers in said random number row to said linear objects; and means for calculating brightness of each of said linear objects, wherein at least one of said ambient light component and said directly reflected light component is multiplied by the random number assigned to said each linear object.

26. An apparatus according to claim 25, wherein said generating means generates said random numbers according to a distribution function, said calculating means calculates said brightness on the basis of an average value and dispersion of said random number row.

27. An apparatus according to claim 26, further comprising means for indicating said average value and dispersion, said generating means generates said random numbers on the basis of the average value and dispersion indicated by said indicating means.

28. An image generation and display apparatus including image data generation apparatus for generating image data and a display for displaying the generated image data by displaying all or part of an image of an aggregation of linear objects, wherein an image of each linear object includes a plurality of continuous segments, and a brightness of each of said segments is calculated by making a sum of at least one of an ambient light component and directly reflected light component at said segment, said image data generation apparatus comprising:

means for indicating by an operator a function for processing at least one of said ambient light component and a directly reflected light component; and means for calculating one of said brightness and displayed color of said linear objects by adding a processed one of said ambient light component and directly reflected light component to the other one of said ambient light component and directly reflected light component.

29. An image generation and display apparatus including image data generation apparatus for generating image data and a display for displaying the generated image data by displaying all or part of an image of an aggregation of linear objects, wherein an image of each linear object includes a plurality of continuous segments, and a brightness of each of said segments is calculated by making a sum of at least one of an ambient light component and directly reflected light component at said segment, said image data generation apparatus comprising:

a display for displaying an image;

an arithmetic processor for calculating a brightness of each said segment on the basis of a shape and reflective property of the image;

means for generating random numbers; and means for assigning the random numbers to said linear objects so as to change the brightness.

30. An image generation and display apparatus including image data generation apparatus for generating image data and a display for displaying the generated image data by displaying all or part of an image of an aggregation of linear objects, wherein an image of each linear object includes a plurality of continuous segments, and a brightness of each of said segments is calculated by making a sum of at least one of an ambient light component directly reflected light component at said segment, said image data generation apparatus comprising:

means for calculating a brightness of each of said segments by making a sum of at least one of an ambient light component and directly reflected light component at said segment;

means for generating a random number for each of said linear objects; and means for calculating colors of said linear object by multiplying each of said segments with said random number.

31. An image generation and display apparatus including image data generation apparatus for generating image data and a display for displaying the generated image data by displaying on a display all or part of an image of an aggregation of linear objects, wherein an image of each linear object includes a plurality of continuous segments, and one of a brightness and displayed color of each of said segments is calculated by making a sum of at least one of an ambient light component and directly reflected light component at said segment, said image data generation apparatus comprising:

means for generating a function with parameters including an index and a reference value indicating said linear object for calculating at least one of an ambient light component and directly reflected light component;

means for indicating said reference value selected by a user; and means for providing a random number in accordance with said reference value for each said linear object.

32. An apparatus according any one of claims 29 to 31, wherein said random number is selected from uniform random numbers, and said apparatus further comprising means for changing a range of said uniform random numbers.

33. An image generation and display apparatus including image data generation apparatus for generating image data and a display for displaying the generated image data by displaying on a display all or part of an image of an aggregation of linear objects, wherein an image of each linear object includes a plurality of continuous segments, and one of a brightness and displayed color of each of said segments is calculated by making a sum of at least one of an ambient light component and directly reflected light component at said segment, said image data generation apparatus comprising:

means for generating random numbers according to a distribution function including an average value and dispersion, and for providing with the random number to at least one of an ambient light component and directly reflected light component; and means for selecting the average value and dispersion by an operator.

34. A method for generating an image of an aggregation of linear objects, wherein an image of each linear object includes a plurality of segments, and one of a brightness and displayed color of each of said segments is calculated by making a sum of at least one of an ambient light component and directly reflected light component at said segment, said method comprising the steps of:

providing a random number for a plurality of segments of said linear object; and providing a different random number, for a plurality of segments of an adjacent linear object.

35. An image displaying method of generating and displaying at least a part of a three-dimensional object as an aggregation of three-dimensional parts of said object using random numbers, comprising the steps of:

computing a brightness Ip for each point of a three-dimensional part as at least the sum of an ambient light component Ia and a directly reflected light component Is; and displaying the computed brightness Ip at each point of each three-dimensional part as the three-dimensional object, wherein in that said step of computing a brightness Ip includes the steps of:

assigning a random number sequence to each of the three-dimensional parts, and computing at least one of said ambient light component Ia and said directly reflected light component Is by applying the random number sequence to at least one of the ambient light component Ia and the directly reflected light component Is.

36. A method according to claim 35, wherein said step of computing the brightness Ip comprises the step of:

computing said brightness Ip based on said directly reflected light component Is and said ambient light component Ia obtained by one of the following equations:

$$Ia = m + \sigma * r;$$

and $$Is = m + \sigma * r$$

where r is a random number of the random number sequence, m is an average value of the random number sequence and $\sigma$ is a dispersion value.

37. A method according to claim 36, wherein a characteristic of the three-dimensional parts is changed by varying the dispersion $\sigma$.

38. A method according to claim 35, wherein said step of assigning a random number sequence said random number sequence is calculated by a random function indicated by an operator.

39. An image displaying apparatus for generating and displaying at least a part of a three-dimensional object as an aggregation of three-dimensional parts of said object using random numbers, comprising:

means for computing a brightness Ip at each point of each three-dimensional part as at least the sum of an ambient light component Ia and a directly reflected light component Is; and means for displaying the computed brightness Ip of the three-dimensional parts as the three-dimensional object, wherein said means for computing the brightness Ip comprises:
 means for generating a random number sequence assigned to each of the three-dimensional parts, and
 means for computing at least one of said ambient light component Ia and said directly reflected light component Is by applying the random number sequence to at least one of the ambient light component Ia and the directly reflected light component Is.

40. An apparatus according to claim 39, comprising:

means for computing the brightness Ip of each very small region from one of the following equations:

$$Ia = m + \sigma * r,$$

and $$Is = m + \sigma * r$$

where said random numbers are those according to a distribution function and the average value and dispersion value of said random row (r) are respectively denoted by m and $\sigma$.

41. An apparatus according to claim 40, comprising:

means for specifying said average value m and said dispersion value $\sigma$, wherein said random number generation means generates the random numbers based on said specified average m and said dispersion $\sigma$.

* * * * *